(12) United States Patent
Denison et al.

(10) Patent No.: US 6,581,108 B1
(45) Date of Patent: Jun. 17, 2003

(54) MANAGING MULTIPLE PRIVATE DATA NETWORKS USING NETWORK AND PAYLOAD ADDRESS TRANSLATION

(75) Inventors: Brett Alan Denison, Dunedin, FL (US); Danny Raz, Aberdeen, NJ (US); Binay Sugla, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,931

(22) Filed: Nov. 30, 1999

(51) Int. Cl.[7] ............... G06F 15/16; G06F 15/173
(52) U.S. Cl. ............. 709/245; 709/246; 709/223; 709/224
(58) Field of Search ................. 709/245, 223, 709/224, 225, 246

(56) References Cited

U.S. PATENT DOCUMENTS

| | | | | |
|---|---|---|---|---|
| 6,032,187 | A | * | 2/2000 | Blain ............... 709/230 |
| 6,058,431 | A | * | 5/2000 | Srisuresh et al. ....... 709/245 |
| 6,128,298 | A | * | 10/2000 | Wootton et al. ........ 370/392 |
| 6,175,867 | B1 | * | 1/2001 | Taghadoss .......... 709/223 |
| 6,226,751 | B1 | * | 5/2001 | Arrow et al. ......... 713/201 |
| 6,243,379 | B1 | * | 6/2001 | Veerina et al. ........ 370/389 |
| 6,353,614 | B1 | * | 3/2002 | Borella et al. ........ 370/389 |
| 6,381,638 | B1 | * | 4/2002 | Mahler et al. ........ 709/220 |

* cited by examiner

Primary Examiner—Glenton B. Burgess
Assistant Examiner—Marlon Johnson
(74) Attorney, Agent, or Firm—Ryan, Mason & Lewis, LLP

(57) ABSTRACT

A network system receives incoming packets from multiple private networks with potentially conflicting Internet Protocol (IP) address spaces, and performs header and payload address translation operations to ensure that the IP address spaces of the incoming packets are made non-conflicting, such that the packets can be managed using a single network management platform. A router in the system receives the packets and performs Network Address Translation (NAT) on IP header information. Packets identified as being associated with a particular protocol, e.g., a Simple Network Management Protocol (SNMP), are redirected by the router to a Management Payload Address Translator (MPAT) that applies a fast parsing process to the packet payloads to identify IP address-related information therein, and if necessary applies an appropriate translation of the identified information before routing the packets to a network management platform. The fast parsing process is an efficient object-based process which avoids the need to parse the entire packet payload.

20 Claims, 2 Drawing Sheets

MANAGING MULTIPLE PRIVATE DATA NETWORKS USING NETWORK AND PAYLOAD ADDRESS TRANSLATION

FIELD OF THE INVENTION

The present invention relates generally to computer networks and more particularly to network management techniques for use in computer networks.

BACKGROUND OF THE INVENTION

Computers and other devices attached to a network utilizing Internet Protocol (IP) addressing are assigned IP addresses which identify those devices so as to facilitate inter-device communications within the network. For devices attached to the Internet or other similar global or wide area network, it is of course important that the devices have unique registered IP addresses, such that network communications can be appropriately routed through the network. However, when companies plan IP address ranges for devices on their private networks, they often take advantage of rules allowing unregistered IP addresses that may be identical to those used by other companies. This is not a problem as long as the private networks do not connect to the Internet or other similar networks in which unique addresses are assured by registration, and do not in other ways appear in the same "address space" together.

This use of conflicting unregistered IP addresses in private networks can become a significant problem, however, when the corresponding conflicting networks are brought into the support systems of a single network management service company. Network management service companies have attempted to solve this problem either by not accepting customers with unregistered IP address domains, or by putting customers with known conflicting IP address spaces on separate domains each using a separate and independent network management station. Unfortunately, this conventional approach results in underutilization of the existing domains and a higher cost per managed device.

Although a number of IP address translation techniques exist, such techniques have not been able to provide an adequate solution to the above-described problem of conflicting unregistered IP addresses in private networks. Examples of such techniques include Network Address Translation (NAT) for IP header address translation, which is currently implemented in public domain software such as Linux and FreeBSD, as well as in many commercial products.

It is therefore apparent that a need exists for improved techniques for translating conflicting addresses into non-conflicting addresses such that multiple private networks can be managed on a single management platform.

SUMMARY OF THE INVENTION

The invention provides methods and apparatus for address translation in a network system. In accordance with an illustrative embodiment of the invention, incoming packets are received from multiple private networks with potentially conflicting address spaces, e.g., potentially conflicting Internet Protocol (IP) address spaces. Header and payload address translation operations are then performed to ensure that the IP address spaces of the incoming packets are made non-conflicting, such that the packets can be managed using a single network management platform. A router in the system receives the packets and performs Network Address Translation (NAT) on IP header information. Packets identified as being associated with a particular protocol, e.g., a Simple Network Management Protocol (SNMP), are redirected by the router to a Management Payload Address Translator (MPAT) that applies a fast parsing process to the packet payloads to identify IP address-related information therein, and if necessary applies an appropriate translation of the identified information before routing the packets to a network management platform. The fast parsing process is an efficient object-based process which avoids the need to parse the entire packet payload.

Advantageously, the invention allows multiple private networks with conflicting addresses to be managed on a single management platform. The invention eliminates the problem of domain underutilization, and substantially reduces the network management cost per managed device.

DETAILED DESCRIPTION OF THE INVENTION

The present invention will be illustrated below in conjunction with an exemplary computer-based network system configured to utilize the Internet Protocol (IP) standard. It should be understood, however, that the invention is not limited to use with any particular type of network system or network communication protocol. The disclosed techniques are suitable for use with a wide variety of other networks and protocols.

The present invention provides techniques for translating conflicting addresses into non-conflicting addresses so that multiple private networks with potentially conflicting address spaces can be managed on a single network management platform.

An illustrative embodiment of the invention provides this address conversion using a two-part process. The first part of the process uses the above-noted conventional, commercially available IP header translation approach known as Network Address Translation (NAT). However, as previously noted, this NAT approach alone is insufficient to solve the conflicting LP address problem. Most available network management platforms, such as Hewlett Packard OpenView (HPOV), use the well-known Simple Network Management Protocol (SNMP) to retrieve address information from network elements. This information is then sent back to the management platform as part of the payload of an SNMP packet. The second part of the address translation process in the illustrative embodiment of the invention is therefore designed to locate and translate IP address related information in the payloads of such SNMP packets, in order to retain consistency in the view as seen by the management platform. As will be described in greater detail below, this part of the address translation process is implemented in a network management device referred to herein as a Management Payload Address Translator (MPAT).

Figure 1:
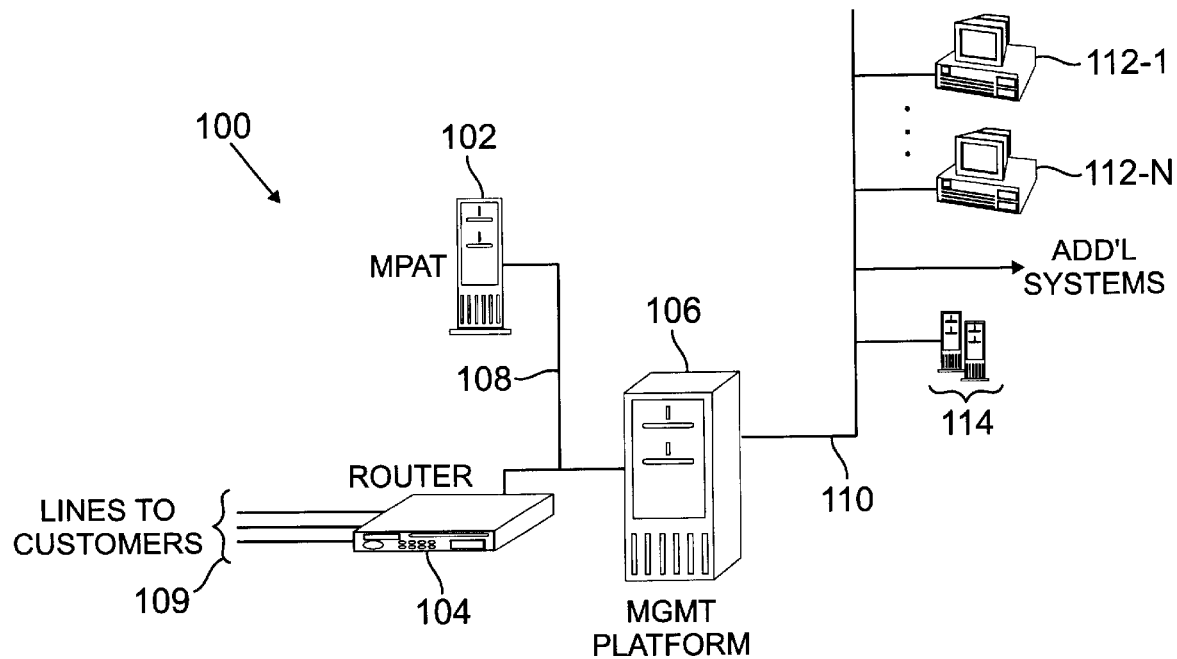
FIG. 1 shows an illustrative embodiment of a network system which incorporates an address translation architecture in accordance with the invention.

FIG. 1 is a block diagram illustrating a portion of a network system 100 configured to include an address translation architecture in accordance with the invention. The network system 100 includes an MPAT 102, a router 104 and a management platform 106, all of which are connected to a network 108. The router 104 is coupled to a number of customer lines 109. The management platform 106 is coupled to a network 110 that includes a set of N terminals 112-1, 112-2, . . . 112-N, a set of databases 114, and connections to additional systems which are not shown in the figure. It should be noted that this particular network system configuration is by way of example only, and should not be construed as limiting the scope of the invention. As will be apparent to those skilled in the art, the address translation techniques of the invention are applicable to numerous other network system configurations.

The router 104 scans all incoming packets received from the customer lines 109. If a given packet originated in a translated customer network, then the header information is translated using conventional NAT. The router 104 may thus be a conventional router with NAT capability, e.g., a PortMaster access router from Lucent Technologies Inc. of Murray Hill, N.J. If a given incoming packet translated by the router 104 is determined to an SNMP packet, it is redirected by the router 104 to the MPAT 102 for payload address translation in accordance with the invention. The router 104 may use conventional IP tunneling to implement this redirection. An incoming packet is therefore sent from either the router 104 or the MPAT 102 to its original destination, in this case the network management platform 106.

As noted previously, the MPAT 102 is designed to locate and translate IP addresses that are contained in the payload of SNMP packets. In operation, it scans all relevant data in a given redirected SNMP packet received from the router 104, parses the ASN.1 encoding used by SNMP, and detects data that is an IP address. The parsing operation is performed in a manner to be described in conjunction with the flow diagram of FIG. 3 below. The MPAT 102 replaces the detected part of the SNMP packet by a translated address if necessary. It can also support translations that are Management Information Base (MIB) document based and are encoded in a non-standard way.

Although shown as a separate device in the FIG. 1 configuration, the MPAT 102 may be implemented in the router 104 in an alternative embodiment. However, in view of the computation requirements associated with payload scanning, it is generally preferable to implement the MPAT 102 as a separate device. For example, MPAT 102 may be implemented as appropriate C software code running on a Solaris-equipped machine or other suitable computer or processing device. Advantageously, such a device can perform the address translation operations described herein at a substantial line speed, e.g., T1 line speed, without any significant delays.

Figure 2:
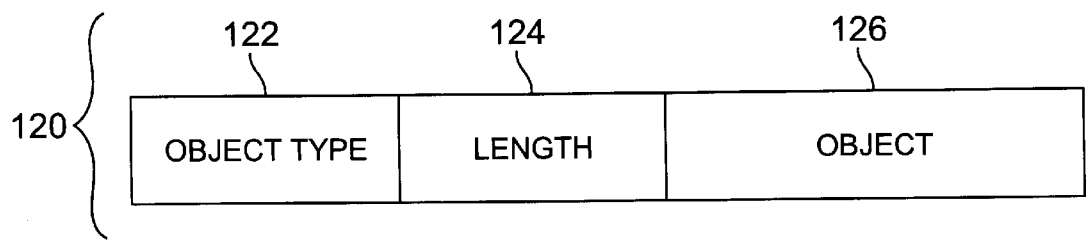
FIG. 2 shows the structure of a basic encoding rules (BER) object that is utilized in an address translation process in accordance with the invention.

FIG. 2 illustrates the structure of an Abstract Syntax Notation (ASN) and Basic Encoding Rules (BER) encoding used by SNMP for a given SNMP packet 120. The SNMP packet 120 in accordance with ASN.1/BER includes an object type 122, an object length 124, and an object 126. The ASN.1 and BER are defined in respective standards ISO-8824-1, Information Technology AO International Organization for Standardization, Abstract Syntax Notation One (ASN.1): Specification of Basic Notation, ISO/IEC 8824-1, 1995, and ISO-8825-1, Information Technology International Organization for Standardization, ASN.1 Encoding Rules: Specification of Basic Encoding Rules (BER), Canonical Encoding Rules (CER) and Distinguished Encoding Rules (DER), ISO/IEC 8825-1, 1995, both of which are incorporated by reference herein. Additional details regarding ASN.1/BER can be found in, e.g., D. Perkins and E. McGinnis, "Understanding SNMP MIBs," Appendix A, Prentice-Hall, 1997, which is incorporated by reference herein.

Figure 3:
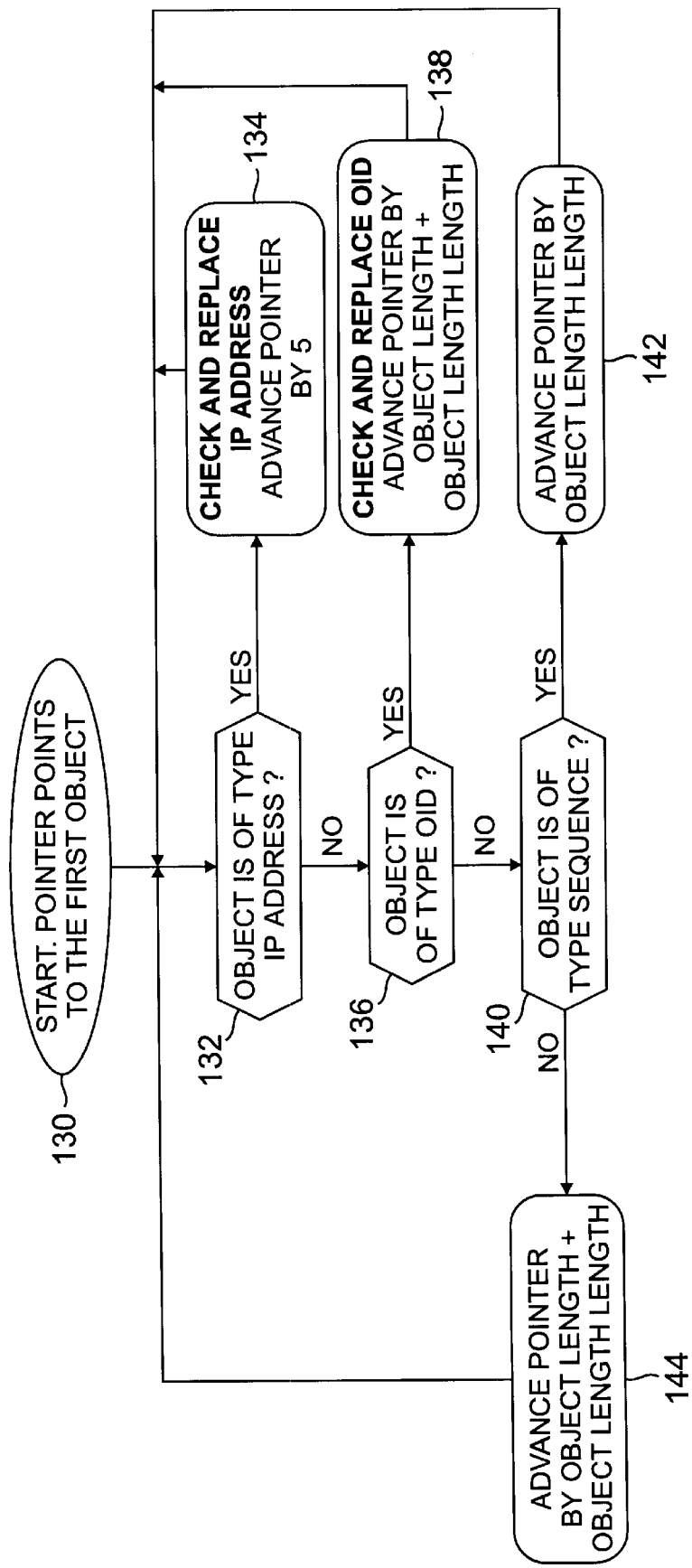
FIG. 3 is a flow diagram illustrating the operation of an address translation process implemented in a Management Payload Address Translator (MPAT) in accordance with the invention.

FIG. 3 is a flow diagram illustrating an address translation process that is implemented in the MPAT 102 of FIG. 1 in accordance with the invention. The process utilizes a fast parsing algorithm designed to detect data that corresponds to an IP address, or data that is contained in specific predefined Object Identifiers (OIDs). As previously noted, each object in the ASN.1/BER encoding used by SNMP has the structure described in conjunction with FIG. 2. The fast parsing algorithm makes use of this structure to search for either an IP address type or predefined OIDs. As will be described in greater detail below, the address translation process of FIG. 3 first parses an entire payload of an SNMP packet in order to detect data that might contain IP addresses or specified OIDs, checks to determine if detected IP addresses or specified OIDs require translation, and if so provides the required translation.

In step 130 of the FIG. 3 address translation process, a pointer points to a first object associated with a given SNMP packet, i.e., an object 126 as shown in FIG. 2. A given packet generally contains some header information, e.g., IP and User Datagram Protocol (UDP) information, and then the payload, which in the case of SNMP is referred to as a Protocol Data Unit (PDU) and is an object of type List. So the fast parsing algorithm in this embodiment starts by pointing to the beginning of the PDU, which is the first object which is an object of type List.

Step 132 then determines if the object currently pointed to by the pointer is of type "IP Address," i.e., contains or otherwise corresponds to an IP address. If so, the process in step 134 checks and replaces the IP address with a translated IP address, and advances the pointer by a designated amount, which is 5 in this example. The process then returns to step 132 to examine the next object pointed to by the updated pointer. If step 132 determines that the object currently pointed to by the pointer is not of type IP Address, step 136 determines if that pointed-to object is of type "OID," i.e., contains or otherwise corresponds to a specified OID. If so, the process in step 138 checks and replaces the OID with a translated OID, and advances the pointer by a designated amount, which in this example is the sum of the object length and the length of the object length, e.g., the sum of the length 124 and the length of length 124 in FIG. 2. The process then returns to step 132 to examine the next object pointed to by the updated pointer.

If step 136 determines that the object currently pointed to by the pointer is not of type OID, step 140 then determines if the object is of type "Sequence." The Sequence type is a so-called "meta" type that contains a sequence of elements each with its own type. So when the parsing algorithm reaches such an element it should parse the elements inside it, and not skip to the next object. Therefore, if the object is of type Sequence, step 142 advances the pointer by an amount corresponding to the length of the object length, and the process then returns to step 132 to examine the next object pointed to by the updated pointer. If step 140 determines that the object is not of type Sequence, step 144 advances the pointer by a designated amount, which is this example is the sum of the object length and the length of the object length. The process then returns to step 132 to examine the next object pointed to by the updated pointer.

Advantageously, the above-described algorithm avoids a complete parsing of a given SNMP packet payload by focusing on the above-noted IP Address, OID and Sequence types, which are generally the only portions of the SNMP packet which may contain information that requires translation by the NPAT 102 in order to ensure non-conflicting addresses.

The check and replace operations in step 134 and 138 utilize a lookup process which attempts to optimize the number of memory accesses per lookup, while maintaining the amount of memory used by the program at a relatively small level. An example lookup process described below focuses on a case in which sub-network masks are of size 8, 16, 24 or 36. This is generally much simpler than attempting to optimize performance for general sub-network masks, e.g., sub-network masks of size 1–32. This lookup example also optimizes for the case in which it is expected that many sub-networks will have the same prefix, i.e. 32.2.3.255, 32.2.4.255, etc. This is due to fact that the sub-network in a given client domain tends to have the same prefix.

The following is a description of an exemplary IP Map data structure that may be utilized in a fast lookup process in accordance with the invention.

```
IP Map:
typedef struct addrNode {
    addrNodePtr nextMap;  /* Pointer to next table */
    int         ipAddr;   /* New address */
    char        comFlag;  /* Matching of IP Address complete */
} AddrNode;
```

The IP Map data structure given above is a 256-element array of address node (AddrNode) structures. All entries are initially null. Setting a value to 255 indicates a mask, e.g., a sub-network mask for 135.24 is 135.24.255.255. The number of leading non-255 integers may be two, e.g., as in 135.24.255.255, or three, as in 135.21.31.255.

As an example of a mapping process using the above-described IP Map data structure, an IP address of 135.21.31.255 could be mapped to 128.21.31.255, and an IP address of 135.24.255.255 would be mapped to 128.24.255.255. An Address Map in accordance with the invention for use in providing this example mapping is as follows:

[0]
[1]
[2]
:
:
[135]→nextMap=(addMap2)
:
:
[254]
[255]
addMap2:
[0]
:
[21]→nextMap=(addMap3)
[22]
[23]
[24]→nextMap=null; ipAddr=128.24.255.255
:
:
[255]

addMap3:
[0]
[1]
:
:
[31]→nextMap=null; ipAddr=135.21.31.255
:
:
[255]

In the above example, any IP address can be looked up in a translation table in a maximum of four lookups. For each subindex of a given IP address, a lookup is performed until the table and IP address are null. This IP address lookup process operates in a manner similar to a tree lookup mapped on an array data structure. Since the maximum depth of the tree is four, the lookup process in this example is guaranteed to be completed in at most four lookups.

The following is a description of an exemplary OID Map data structure that may be utilized in a fast lookup process in accordance with the invention.

```
OID Map:
typedef struct oidNode {
    u_char  *oid;    /* The oid itself */
    int     length;  /* Length of oid */
} OIDNode;
```

The OID Map above is an array of OIDNode structures. Each OIDNode comprises a character array and the length of the array. This OIDNode structure is similar to the IP Address structure previously described, but may have any length. The same IP Address structure could be used for OID if the number of possible OIDs is sufficiently large.

As previously noted, the above-described embodiments of the invention are illustrative only. Alternative embodiments may be implemented in other types of computer networks, using hardware and software configurations other than those specifically described herein. These and numerous other alternative embodiments within the scope of the following claims will be readily apparent to those skilled in the art.

What is claimed is:

1. A method for providing address translation for a plurality of packets received in a network system, the method comprising the steps of:

performing network address translation operations on at least a subset of the packets;

identifying particular ones of the translated packets as being associated with a designated network management protocol;

parsing the identified network management protocol packets to determine if the payload of a given one of the network management protocol packets contains additional address information requiring further translation, wherein the parsing step as applied to the given network management protocol packet parses the payload of that packet to identify if any of a plurality of different object types are present in the payload, the plurality of different object types comprising at least an address object type, an object identifier object type, and a sequence indicator object type; and applying an additional translation operation to the additional address information of at least one of the identified network management protocol packets as determined in the parsing step, such that the packets are thereby provided with non-conflicting address spaces.

2. The method of claim 1 wherein the designated network management protocol comprises a Simple Network Management Protocol (SNMP).

3. The method of claim 1 wherein the address information comprises Internet Protocol (IP) address information.

4. The method of claim 1 wherein the packets are associated with a plurality of distinct networks having at least partially conflicting address spaces.

5. The method of claim 1 wherein the parsing step comprises an object-based parsing which utilizes a pointer to an object associated with a given one of the packets.

6. The method of claim 5 wherein the parsing step comprises determining if a given one of the packets includes one or more of IP address information, a specified object identifier (OID) and a sequence indicator.

7. The method of claim 6 wherein the additional translation operation utilizes an IP map data structure and an OID data structure for translating IP address and OID information, respectively, in a payload of a given one of the packets.

8. The method of claim 1 wherein the parsing and additional translation steps are implemented in a management payload address translator which receives the identified translated packets from a router with network address translation capability.

9. The method of claim 8 wherein the management payload address translator and the router are implemented on separate machines, both of which are connected to communicate with a network management platform.

10. An apparatus for providing address translation for a plurality of packets received in a network system, the apparatus comprising:

at least one processor-based device operative: (i) to perform network address translation operations on at least a subset of the packets; (ii) to identify particular ones of the translated packets as being associated with a designated network management protocol; (iii) to parse the identified network management protocol packets to determine if the payload of a given one of the network management protocol packets contains additional address information requiring further translation, wherein the parsing step as applied to the given network management protocol packet parses the payload of that packet to identify if any of a plurality of different object types are present in the payload, the plurality of different object types comprising at least an address object type, an object identifier object type, and a sequence indicator object type; and (iv) to apply an additional translation operation to the additional address information of at least one of the identified network management protocol packets as determined in the parsing step, such that the packets are thereby provided with non-conflicting address spaces.

11. An apparatus for providing address translation for a plurality of packets received in a network system, the apparatus comprising:

a network address translator operative to perform network address translation operations on at least a subset of the packets; and a management payload address translator operative to receive from the network address translator particular ones of the translated packets identified as being associated with a designated network management protocol; to parse the identified network management protocol packets to determine if the payload of a given one of the network management protocol packets contains additional address information requiring further translation, wherein the parsing step as applied to the given network management protocol packet parses the payload of that packet to identify if any of a plurality of different object types are present in the payload, the plurality of different object types comprising at least an address object type, an object identifier object type, and a sequence indicator object type; and to apply an additional translation operation to the additional address information of at least one of the identified network management protocol packets as determined in the parsing step, such that the packets are thereby provided with non-conflicting address spaces.

12. The apparatus of claim 11 wherein the designated network management protocol comprises a Simple Network Management Protocol (SNMP).

13. The apparatus of claim 11 wherein the address information comprises Internet Protocol (IP) address information.

14. The apparatus of claim 11 wherein the packets are associated with a plurality of distinct networks having at least partially conflicting address spaces.

15. The apparatus of claim 11 wherein the management payload address translator implements an object-based parsing process which utilizes a pointer to an object associated with a given one of the packets.

16. The apparatus of claim 15 wherein the parsing process determines if a given one of the packets includes one or more of IP address information, a specified object identifier (OID) and a sequence indicator.

17. The apparatus of claim 16 wherein the additional translation operation utilizes an IP map data structure and an OID data structure for translating IP address and OID information, respectively, in a payload of a given one of the packets.

18. The apparatus of claim 11 wherein the management payload address translator receives the identified translated packets from a router which implements the network address translator.

19. The apparatus of claim 18 wherein the management payload address translator and the router are implemented on separate machines, both of which are connected to communicate with a network management platform.

20. An article of manufacture comprising a machine-readable storage medium for storing one or more software programs for performing address translation operations for a plurality of packets received in a network system, wherein the one or more software programs when executed implement the steps of:

performing network address translation operations on at least a subset of the packets;

identifying particular ones of the translated packets as being associated with a designated network management protocol;

parsing the identified network management protocol packets to determine if the payload of a given one of the network management protocol packets contains additional address information requiring further translation, wherein the parsing step as applied to the given network management protocol packet parses the payload of that packet to identify if any of a plurality of different object types are present in the payload, the plurality of different object types comprising at least an address object type, an object identifier object type, and a sequence indicator object type; and applying an additional translation operation to the additional address information of at least one of the identified network management protocol packets as determined in the parsing step, such that the packets are thereby provided with non-conflicting address spaces.

* * * * *